(12) United States Patent
Jeon et al.

(10) Patent No.: US 6,683,566 B2
(45) Date of Patent: Jan. 27, 2004

(54) ELECTRONIC ACTIVE PHASE CONTROL ARRAY ANTENNA, METHOD FOR COMPENSATING FOR DIRECTION DIFFERENCES AT THE ANTENNA, AND SATELLITE TRACKING SYSTEM AND METHOD USING THE ANTENNA

(75) Inventors: Soon-Ik Jeon, Daejeon (KR); Seong-Ho Son, Busan (KR); Jae-Ick Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 20 days.

(21) Appl. No.: 10/183,464

(22) Filed: Jun. 28, 2002

(65) Prior Publication Data

US 2003/0122709 A1 Jul. 3, 2003

(30) Foreign Application Priority Data

Dec. 28, 2001 (KR) .......................... 2001-86508

(51) Int. Cl.⁷ .............................. G01S 3/28; H01Q 3/22
(52) U.S. Cl. ...................................... 342/383; 342/375
(58) Field of Search ................................ 342/359, 383, 342/375

(56) References Cited

U.S. PATENT DOCUMENTS

| | | | | |
|---|---|---|---|---|
| 3,435,453 A | * | 3/1969 | Howard | 342/383 |
| 4,638,318 A | * | 1/1987 | Gutleber | 342/383 |
| 4,872,016 A | * | 10/1989 | Kress | 342/380 |
| 6,204,822 B1 | | 3/2001 | Cardiasmenos et al. | |
| 6,232,920 B1 | | 5/2001 | Brookner et al. | |

* cited by examiner

*Primary Examiner*—Gregory C. Issing
(74) *Attorney, Agent, or Firm*—Jacobson Holman PLLC

(57) ABSTRACT

Disclosed is an electronic active phase control array antenna having two beams which comprises: a first array unit for performing phase shifting on radio waves received via satellite communication, combining them, and generating first beams on the basis of a first phase delay control value according to a first beam frequency; and a second array unit for performing phase shifting on the output value phase-shifted by the first array unit on the basis of a second phase delay control value for compensating for the phase delay difference according to a second beam frequency shifted through the first array unit, and generating second beams.

11 Claims, 3 Drawing Sheets first beam outputs second beam outputs

ELECTRONIC ACTIVE PHASE CONTROL ARRAY ANTENNA, METHOD FOR COMPENSATING FOR DIRECTION DIFFERENCES AT THE ANTENNA, AND SATELLITE TRACKING SYSTEM AND METHOD USING THE ANTENNA

CROSS REFERENCE TO RELATED APPLICATION

This application is based on Korea Patent Application No. 2001-86508 filed on Dec. 28, 2001 in the Korean Intellectual Property Office, the content of which is incorporated herein by reference.

BACKGROUND OF THE INVENTION (a) Field of the Invention

The present invention relates to an electronic active phase control array antenna for satellite communications. More specifically, the present invention relates to an electronic active phase control array antenna, a method for compensating for direction differences at the antenna, and a satellite tracking system and method using the antenna so as to resolve direction differences generated between two beams with different frequencies in the case of applying an electronic active phase control array antenna (referred to as an array antenna hereinafter) having two beams to broadband radio transmission and receiving methods.

(b) Description of the Related Art

FIG. 1 shows a conventional array antenna.

As shown, the array antenna comprises: an antenna 100; array antenna elements 102; phase shifters 103; and a signal combiner 104.

When incidence radio waves 101 that are incident to the antenna 100 reach the array antenna elements 102, the respective incidence radio waves 101 arrive at the array antenna elements 102 with different delay distances determined with respect to the directional angle θ.

For example, when each distance between the M array antenna elements 102 is set to be "d", the propagation delay phase from a reference point is kMd sin θ. In this instance, since the propagation constant "k" is 2πf/c, a difference of the corresponding delay phase value is generated according to the frequency "f", but since the conventional phase shifter 103 is used with a fixed predetermined frequency, a directional error caused by the frequency difference occurs in the external frequency of a predetermined frequency in the broadband case.

In another conventional technical configuration, a different phase shifter group may be installed below the phase shifters 103 so as to generate second beams, but in this case, since the second beams are generated using a calculated value fixed to a conventional predetermined frequency, the same directional errors occur.

In the identical manner, the same directional errors are generated in a structure for generating third or more than third beams because of the prior art configuration.

When the direction difference according to the prior art frequency difference is neglected as described above, since phase control codes that are calculated by fixing to a predetermined frequency are used for the respective frequencies without performing control through phase control codes independent of the respective component frequencies, the electronic beams of the antenna in broadband communications do not have a target directional angle θ of the antenna's actual target position 201 but rather they have a wrong target directional angle θ' that directs a wrong target position 202, as shown in the example of the directional difference caused by the frequency difference shown in FIG. 2.

A single electronic beam phase is controlled with independent phase control codes with respect to the respective component frequencies by consideration of the above problem, and in this case, the frequency applied to the first beam cannot be used for a method for generating a plurality of beams with respective different frequencies, and the respective frequencies used to the second or greater beams cannot be applied to the propagation delay phase calculation equation kMd sin θ.

The directional difference according to the prior art frequency difference reduces the antenna's satellite tracking gain and increases satellite tracking errors, and accordingly, the antenna gain cannot be effectively guaranteed and the satellite communication quality greatly worsens.

SUMMARY OF THE INVENTION

It is an object of the present invention to provide an electronic active phase control array antenna, a method for compensating for direction differences at the antenna, and a satellite tracking system and method using the antenna for considering directional differences according to frequency differences, and compensating for directional differences caused by the frequency differences and improving satellite communication quality when generating a plurality of beams with different frequencies.

In one aspect of the present invention, an electronic active phase control array antenna having two beams comprises: a first array unit for performing phase shifting on radio waves received via satellite communication, combining them, and generating first beams on the basis of a first phase delay control value according to a first beam frequency; and a second array unit for performing phase shifting on the output value phase-shifted by the first array unit on the basis of a second phase delay control value for compensating for the phase delay difference according to a second beam frequency shifted through the first array unit, and generating second beams.

The first array unit comprises: M array antenna elements for receiving radio waves via satellite communication, M representing a natural number; M first phase shifters for shifting phases of the radio waves respectively received through the M array antenna elements according to the first phase delay control value, and outputting results; M/2N first signal combiners for dividing the outputs of the M first phase shifters into N groups, combining outputs of the N divided groups, and outputting results, N representing a natural number of less than M; and a first beam signal combiner for combining the signals output from the M/2N first beam signal combiners to generate the first beams.

The second array unit comprises: M/2N second phase shifters for shifting the signals output from the M/2N first signal combiners according to the second phase delay control value, and outputting them respectively; and a second beam signal combiner for combining the signals output from the M/2N second phase shifters to generate the second beams.

In another aspect of the present invention, a method for compensating for directional differences using an electronic active phase control array antenna comprising a first array unit for performing phase shifting on radio waves received via satellite communication, combining them, and generating first beams on the basis of a first phase delay control value according to a first beam frequency; and a second array unit for performing phase shifting on the output value phase-shifted by the first array unit on the basis of a second phase delay control value for compensating for the phase delay difference according to a second beam frequency shifted through the first array unit, and generating second beams, comprises: assigning the first phase delay control code value of the first beam frequency so that the first beam may have a direction toward a first beam propagation incident direction; the second beam frequency passing through the first arraying unit to generate a phase delay according to a wrong second beam directional angle; and assigning the second phase delay control code value to generate a second phase delay corresponding to a second beam compensation moving angle generated by adding the second beam directional error angle to a second beam target moving angle of a second beam target directional angle.

The second phase delay control value is calculated from a value obtained by finding a second array phase control value with respect to a U coordinate axis and a second array phase control value with respect to a V coordinate axis, and linearly adding them when representing a directional two-dimensional plane as an antenna directional coordinate system that is the U and V coordinate.

The second beam positioned at a directional coordinate corresponding to the wrong second beam directional angle on the U and V coordinate system is moved to a second beam compensation moving directional coordinate and then it is compensated.

The movement of the second beam compensation moving direction is performed to a second beam compensation moving U vector component position and a second beam compensation moving V vector component position respectively vector-projected to the U and V coordinate axes with respect to the first beam directional coordinate.

In still another aspect of the present invention, a satellite tracking system cooperative with an electronic active phase control array antenna comprising a first array unit for performing phase shifting on radio waves received via satellite communication, combining them, and generating first beams on the basis of a first phase delay control value according to a first beam frequency; and a second array unit for performing phase shifting on the output value phase-shifted by the first array unit on the basis of a second phase delay control value for compensating for the phase delay difference according to a second beam frequency shifted through the first array unit, and generating second beams, comprises: a lookup table for representing a directional two-dimensional plane on an antenna directional coordinate system that is the U and V coordinates, and storing previously calculated U and V coordinate calculation values; a satellite tracking controller for receiving initial input data, performing desired first beam directional calculation on them, and outputting a first beam directional value and a corresponding frequency, and using the initial input data to perform a second beam directional calculation, and calculating a second calculation result parameter that is a second beam phase control value to output a second array phase control code value; a receiving beam controller for receiving the first beam directional value and corresponding frequency information output from the satellite tracking controller, calculating a first array phase delay control value for radio wave receiving, and outputting it to the first array unit; and a transmitting beam controller for receiving the first beam directional value and corresponding frequency information output from the satellite tracking controller, calculating a first array phase control value for radio wave transmission, and outputting it to the first array unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
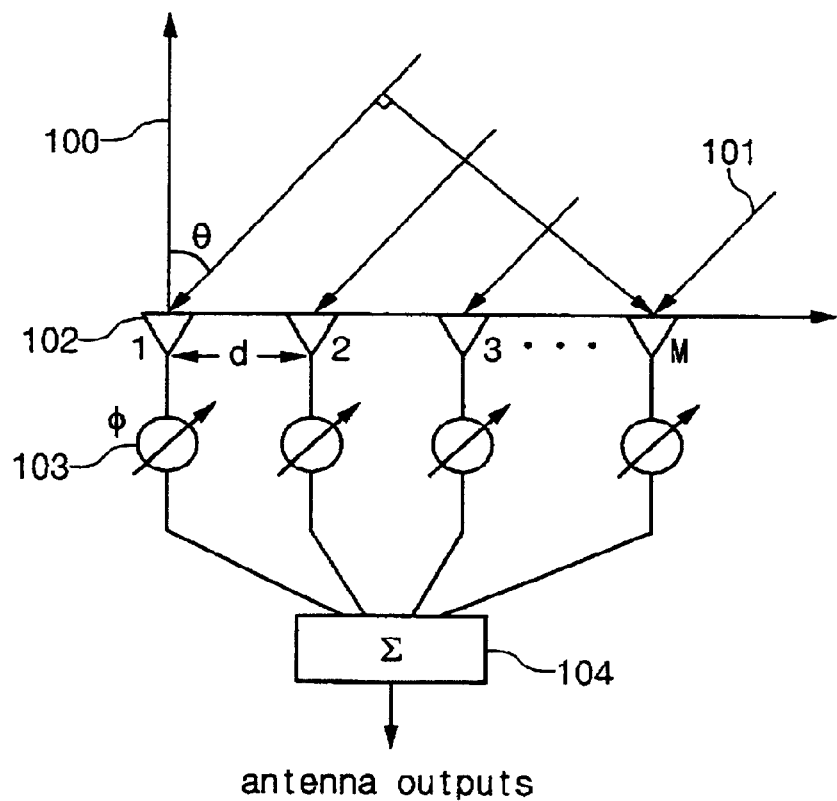
FIG. 1 shows a conventional active phase control array antenna (referred to as an array antenna hereinafter)
Figure 2:
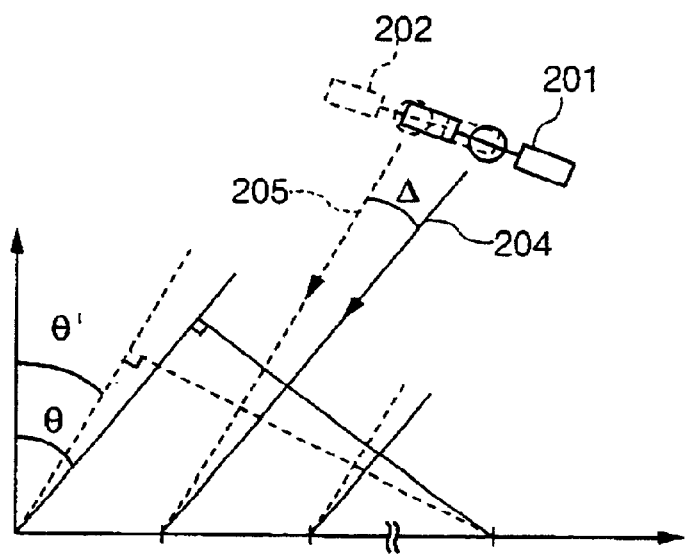
FIG. 2 shows a conventional exemplified diagram of directional difference according to a frequency difference.
Figure 3:
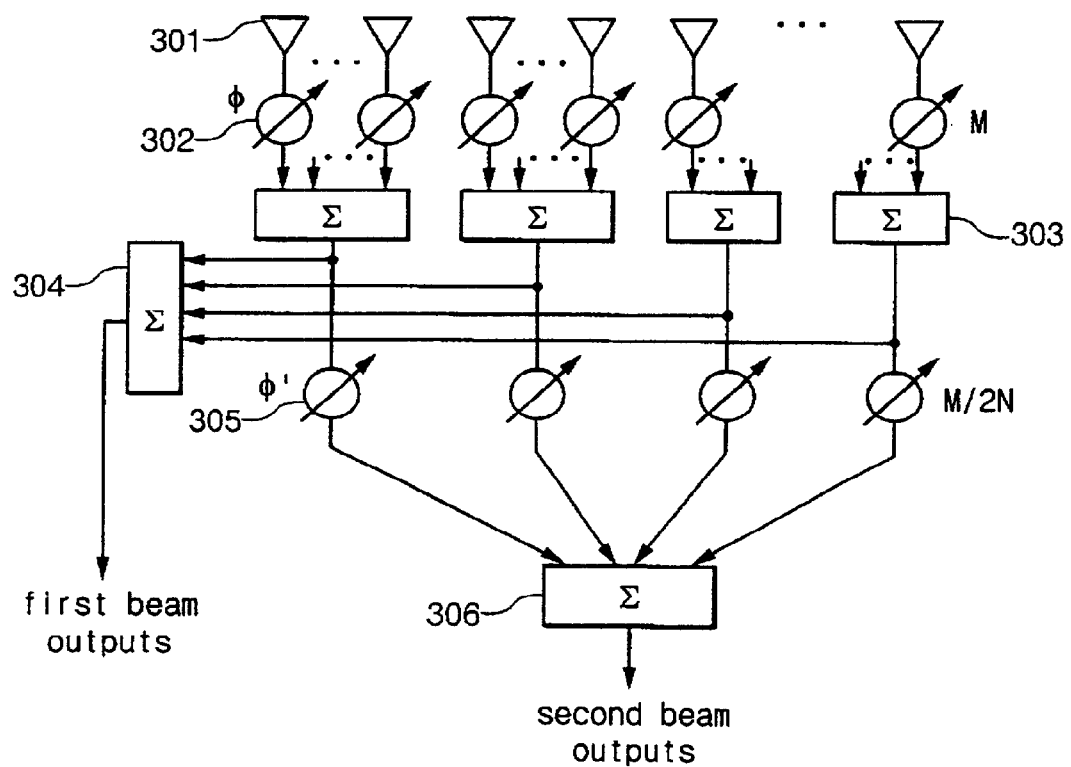
FIG. 3 shows an electronic active phase control array antenna according to a preferred embodiment of the present invention.

FIG. 3 shows an electronic active phase control array antenna according to a preferred embodiment of the present invention.

As shown, the broadband array antenna comprises M (M representing a natural number) array antenna elements 301; M first array phase shifters 302; M/2N (N indicating a natural number) first signal combiners 303; a first beam signal combiner 304; M/2N second array phase shifters 305; and a second beam signal combiner 306.

The M first array phase shifters 302 shift phases of the input radio waves received through the respective M array antenna elements 301, and output results.

The M/2N first beam signal combiners 303 combine the signals output from the first array phase shifters 302 respectively formed into 2N groups, and respectively output results.

The first beam signal combiner 304 combines M/2N signals output from the M/2N first beam signal combiners 303 to generate first beam outputs.

The M/2N second array phase shifters 305 shift phases of the M/2N signals output from the M/2N first beam signal combiners 303 to output results.

The second beam signal combiner 306 combines the M/2N signals output from the M/2N second array phase shifters 305 to generate second beam outputs.

As a result, the configuration of the array antenna according to the preferred embodiment of the present invention includes a first beam output unit for performing first phase-shifting on the outputs of the first array unit comprising M array antenna elements 301 for receiving radio waves via satellite communication, combining them, and outputting results; and a second beam output unit for combining the results into a second array unit of M/2N groups, performing second phase-shifting on the M/2N outputs provided from the second array unit, combining them, and outputting result values.

Figure 4:
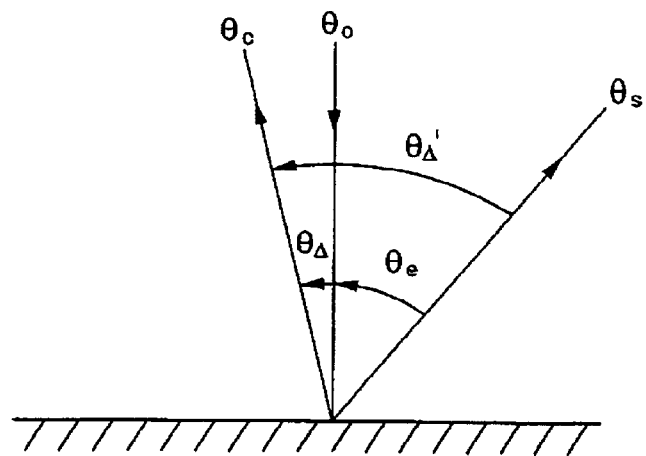
FIG. 4 shows a diagram of a method for compensating for directional differences according to a preferred embodiment of the present invention.

FIG. 4 shows a diagram of a method for compensating for directional differences according to a preferred embodiment of the present invention.

As shown, when the first beam has a direction of a first beam propagation incident direction $\theta_o$, a value $k_R M_i d \sin \theta_o$ is assigned for a phase delay control value of the first array phase shifter 302 for shifting the outputs of the $i^{th}$ array antenna element 301 from among the M array antenna elements 301 having a distance d between the elements with respect to the first array frequency $f_R$.

Since a second beam signal operable at the frequency $f_S$ may be operable at a different frequency when passing through the first array unit, a value $k_S M_i d \sin \theta_S$ having a wrong second beam directional angle $\theta_S$ is assigned to the phase delay value.

Therefore, a second phase delay control value corresponding to the second beam compensation moving angle $\theta_A'$ made by adding the second beam directional error angle $\theta_e$ caused by the frequency difference of the first array unit and the second beam target moving angle $\theta_A$ with respect to the second beam target directional angle $\theta_c$ is assigned to the M/2N second array phase shifters 305 to generate second beams.

As described above, when the second array phase control code compensated with the second beam frequency $f_S$ is calculated and it is assigned to the second array phase shifter 305, the directional difference is compensated with no relation to the frequency difference of the first array.

Figure 5:
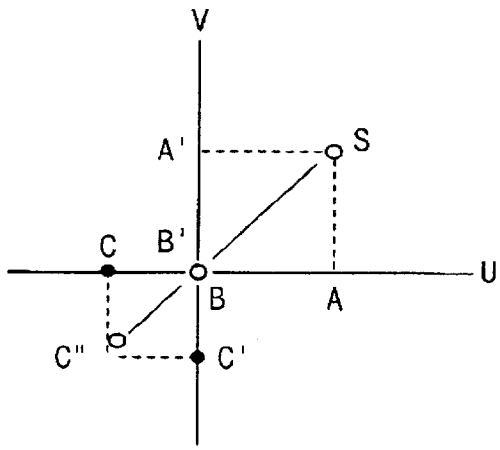
FIG. 5 shows a diagram for illustrating a directional two-dimensional plane as an antenna directional coordinate system to describe the method for compensating for directional differences according to a preferred embodiment of the present invention.

FIG. 5 shows a diagram for illustrating a directional two-dimensional plane as an antenna directional coordinate system to describe the method for compensating for directional differences according to a preferred embodiment of the present invention.

As shown, when presenting a directional two-dimensional plane on the U and V coordinates that is a general antenna direction coordinate system in the case of calculating the second array phase control codes compensated with the second beam frequency, directional difference compensation is performed on the U and V coordinates respectively, and compensation results are linearly added so as to increase calculation efficiencies by a simple calculation in the first and second arrays that are two-dimensional plane arrays.

To move the second beam positioned at the wrong second beam directional coordinate S to a second beam compensation moving directional coordinate C" on the UV coordinate system, the second beam is moved to the second beam compensation moving U vector component position C that is a vector-projected position on the U coordinate axis and the second beam compensation moving V vector component position C' that is a vector-projected position on the V coordinate axis with respect to the first beam directional coordinate position O through an independent second array compensation phase control.

A method for controlling the directional difference compensation as noted above will now be described.

First, the wrong second beam directional angle $\theta_S$ is found from $k_R \sin \theta_O = k_S \sin \theta_S$, and the second beam directional error $\theta_e$ is found from $\theta_e = \theta_O - \theta_S$ on the U coordinate axis.

The second beam compensation moving angle $\theta_A'$, generated by adding the second beam directional error angle $\theta_e$ to the second beam target moving angle $\theta_A$, is found using $\theta_A' = \theta_A + \theta_e$; and by using the second beam compensation moving angle $\theta_A'$, the second array phase control value $C_U = k_S (M/2N) id \sin \theta_A'$ on the U coordinate axis is calculated with respect to the $i^{th}$ array.

Regarding the V coordinate axis, the second array phase control value C_V of the V coordinate axis is found through the same calculation applied to the U coordinate axis to find a total second array phase control value C_T by adding C_U to C_V, and a corresponding phase control code value of the $i^{th}$ array is calculated to assign it to the second array phase shifter 305.

Figure 6:
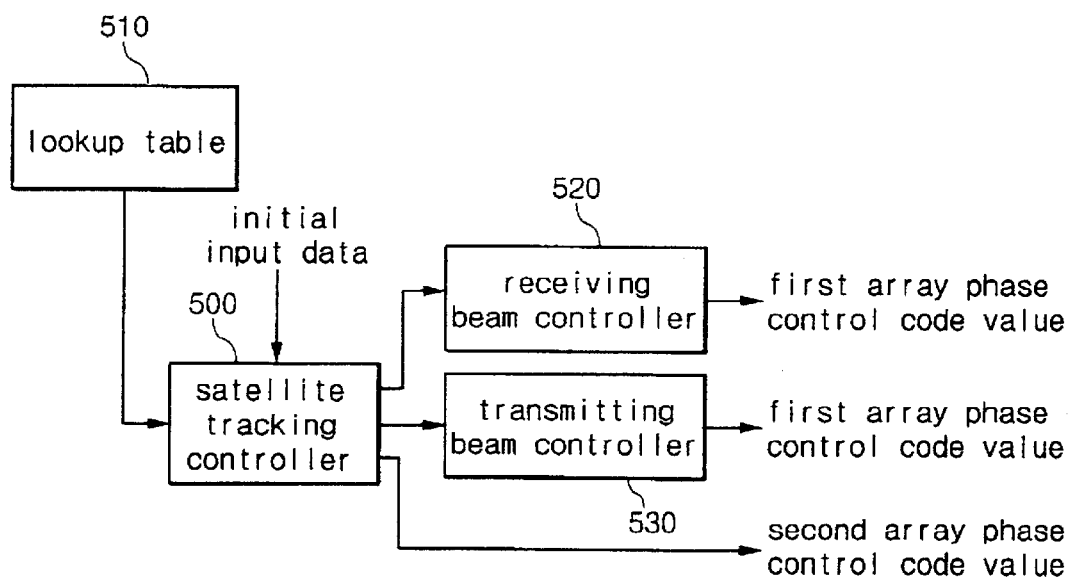
FIG. 6 shows a block diagram of a satellite tracking system using a broadband array antenna enabling directional difference compensation according to a preferred embodiment of the present invention.

FIG. 6 shows a block diagram of a satellite tracking system using a broadband array antenna enabling directional difference compensation according to a preferred embodiment of the present invention.

As shown, the satellite tracking system comprises a satellite tracking controller 500; a lookup table 510; a receiving beam controller 520; and a transmitting beam controller 530.

The satellite tracking controller 500 receives initial input data and performs a desired first beam directional calculation to output a first beam directional value and a corresponding frequency, uses the initial input data and performs a second beam directional calculation to output a first calculation result parameter, calculates a second beam phase control value that is a second calculation result parameter, and uses the calculated second beam phase control value to calculate a second array phase control code value and assign it to the second array phase shifter 305.

In this instance, the initial input data include various different frequencies such as a transmitting frequency f_T, a receiving frequency f_R, and a satellite tracking frequency f_S.

The lookup table 510 stores previously calculated U and V coordinate calculation values for better calculation performance of the satellite tracking controller 500.

The receiving beam controller 520 receives a first beam directional value and corresponding frequency information output from the satellite tracking controller 500 to calculate a first array phase control value for radio wave receiving, and generates a corresponding first array phase control code value to assign it to the first array phase shifter 303.

The transmitting beam controller 530 receives a first beam directional value and corresponding frequency information output from the satellite tracking controller to calculate a first array phase control value for radio wave transmission, and outputs a corresponding phase control code value to assign it to the first array phase shifter 303.

The present invention discloses first and second beam configurations and corresponding directional error compensation methods, and further, the above-noted compensation methods can be applied to an array antenna configuration having a plurality of beams to compensate for directional differences generated from the respective beams according to a plurality of frequency differences.

The present invention increases satellite tracking gains by the value $\cos \theta_e$, decreases corresponding satellite tracking errors to effectively guarantee the antenna gains, and improve satellite communication quality when the gain track has a characteristic of $\cos \theta$ with respect to the forward direction, when compared with a conventional method for neglecting a directional error value $\theta_e$ that is a directional difference value caused by the frequency difference.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An electronic active phase control array antenna having two beams, comprising:
 a first array unit for performing phase shifting on radio waves received via satellite communication, combining them, and generating first beams on the basis of a first phase delay control value according to a first beam frequency; and
 a second array unit for performing phase shifting on the output value phase-shifted by the first array unit on the basis of a second phase delay control value for compensating for the phase delay difference according to a second beam frequency shifted through the first array unit, and generating second beams.

2. The array antenna of claim 1, wherein the first array unit comprises:
 M array antenna elements for receiving radio waves via satellite communication, M representing a natural number;
 M first phase shifters for shifting phases of the radio waves respectively received through the M array antenna elements according to the first phase delay control value, and outputting results;
 M/2N first signal combiners for dividing the outputs of the M first phase shifters into N groups, combining outputs of the N divided groups, and outputting results, N representing a natural number of less than M; and
 a first beam signal combiner for combining the signals output from the M/2N first beam signal combiners to generate the first beams.

3. The array antenna of claim 1, wherein the second array unit comprises:
 M/2N second phase shifters for shifting the signals output from the M/2N first signal combiners according to the second phase delay control value, and outputting them respectively; and
 a second beam signal combiner for combining the signals output from the M/2N second phase shifters to generate the second beams.

4. A method for compensating for directional differences using an electronic active phase control array antenna comprising a first array unit for performing phase shifting on radio waves received via satellite communication, combining them, and generating first beams on the basis of a first phase delay control value according to a first beam frequency; and a second array unit for performing phase shifting on the output value phase-shifted by the first array unit on the basis of a second phase delay control value for compensating for the phase delay difference according to a second beam frequency shifted through the first array unit, and generating second beams, comprising:
 assigning the first phase delay control code value of the first beam frequency so that the first beam may have a direction toward a first beam propagation incident direction;
 the second beam frequency passing through the first arraying unit to generate a phase delay according to a wrong second beam directional angle; and
 assigning the second phase delay control code value to generate a second phase delay corresponding to a second beam compensation moving angle generated by adding the second beam directional error angle to a second beam target moving angle of a second beam target directional angle.

5. The method of claim 4, wherein the second phase delay control value is calculated from a value obtained by finding a second array phase control value with respect to a U coordinate axis and a second array phase control value with respect to a V coordinate axis, and linearly adding them when representing a directional two-dimensional plane as an antenna directional coordinate system that is the U and V coordinate.

6. The method of claim 5, wherein the second beam positioned at a directional coordinate corresponding to the wrong second beam directional angle on the U and V coordinate system is moved to a second beam compensation moving directional coordinate and then it is compensated.

7. The method of claim 6, wherein the movement of the second beam compensation moving direction is performed to a second beam compensation moving U vector component position and a second beam compensation moving V vector component position respectively vector-projected to the U and V coordinate axes with respect to the first beam directional coordinate.

8. The method of claim 5, wherein the wrong second beam directional angle $\theta_S$ is found from the equation $k_R \sin \theta_O = k_S \sin \theta_S$ where $k_R$ represents a propagation constant of the first beam frequency $f_R$, $\theta_O$ denotes the first beam directional angle, and $k_S$ indicates a propagation constant of the second beam frequency $f_S$;
 the second beam directional error angle $\theta_e$ is found from the equation $\theta_e = \theta_O - \theta_S$;
 the second beam compensation moving angle $\theta_A'$ is obtained from the equation $\theta_{66}' = \theta_A + \theta_e$ where $\theta_{66}$ represents a second beam target moving angle; and
 the second array phase control values with respect to the U and V coordinate axes are found from the equation $k_S(M/2N)$id $\sin \theta_A'$ where M represents a number of array antenna elements in the first array unit, 2N indicates a number of signal combiners in the second array unit, and i denotes the $i^{th}$ signal combiner.

9. A satellite tracking system cooperative with an electronic active phase control array antenna, comprising a first array unit for performing phase shifting on radio waves received via satellite communication, combining them, and generating first beams on the basis of a first phase delay control value according to a first beam frequency; and a second array unit for performing phase shifting on the output value phase-shifted by the first array unit on the basis of a second phase delay control value for compensating for the phase delay difference according to a second beam frequency shifted through the first array unit, and generating second beams, comprising:
 a lookup table for representing a directional two-dimensional plane on an antenna directional coordinate system that is the U and V coordinates, and storing previously calculated U and V coordinate calculation values;
 a satellite tracking controller for receiving initial input data, performing desired first beam directional calculation on them, and outputting a first beam directional value and a corresponding frequency, and using the initial input data to perform a second beam directional calculation, and calculating a second calculation result parameter that is a second beam phase control value to output a second array phase control code value;

a receiving beam controller for receiving the first beam directional value and corresponding frequency information output from the satellite tracking controller, calculating a first array phase delay control value for radio wave receiving, and outputting it to the first array unit; and a transmitting beam controller for receiving the first beam directional value and corresponding frequency information output from the satellite tracking controller, calculating a first array phase control value for radio wave transmission, and outputting it to the first array unit.

10. The system of claim 9, wherein the initial input data comprise a transmission frequency, a receiving frequency, and a satellite tracking frequency.

11. A method for tracking a satellite cooperated with an electronic active phase control array antenna, comprising a first array unit for performing phase shifting on radio waves received via satellite communication, combining them, and generating first beams on the basis of a first phase delay control value according to a first beam frequency; and a second array unit for performing phase shifting on the output value phase-shifted by the first array unit on the basis of a second phase delay control value for compensating for the phase delay difference according to a second beam frequency shifted through the first array unit, and generating second beams, comprising:

(a) assigning a first phase delay control value calculated according to the first beam frequency to the first array unit;

(b) calculating a second phase delay control value according to the second beam frequency, the second phase delay control value being calculated according to steps of calculating a wrong second beam directional angle corresponding to a phase delay generated when the second beam frequency passes through the first array unit, and calculating the second phase delay control value so as to generate a phase delay corresponding to a second beam compensation moving angle obtained by adding the calculated second beam directional error angle to the second beam target moving angle with respect to the second beam target directional angle; and (c) assigning the calculated second phase delay control value to the second array unit.

* * * * *